(12) United States Patent
Naar et al.

(10) Patent No.: US 11,347,624 B1
(45) Date of Patent: May 31, 2022

(54) SYSTEMS AND METHODS FOR APPLICATION EXCEPTION HANDLING

(71) Applicant: Meta Platforms, Inc., Menlo Park, CA (US)

(72) Inventors: Dekel Shmuel Naar, Tel Aviv (IL); Yaniv Sabo, Maccabim-Reut (IL)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/457,251

(22) Filed: Jun. 28, 2019

(51) Int. Cl.
*G06F 11/36* (2006.01)

(52) U.S. Cl.
CPC ...... *G06F 11/3636* (2013.01); *G06F 11/3612* (2013.01); *G06F 11/3664* (2013.01)

(58) Field of Classification Search
CPC ....... G06F 11/36–3604; G06F 11/3612; G06F 11/362; G06F 11/3636–364; G06F 11/3664
See application file for complete search history.

(56) References Cited

U.S. PATENT DOCUMENTS

| | | | | |
|---|---|---|---|---|
| 8,683,439 B2* | 3/2014 | Daniel | ................ | G06F 11/3624 717/124 |
| 9,213,622 B1* | 12/2015 | Morgan | ............... | G06F 11/3636 |
| 9,262,300 B1* | 2/2016 | Haba | ...................... | G06F 11/362 |
| 10,565,090 B1* | 2/2020 | Bowerman | ......... | G06F 11/3624 |
| 2003/0101438 A1* | 5/2003 | Mishra | ..................... | G06F 8/51 717/136 |
| 2006/0064677 A1* | 3/2006 | Bickson | ............... | G06F 11/3664 717/124 |
| 2006/0117296 A1* | 6/2006 | Gimness | ................. | G06F 9/449 717/118 |
| 2013/0332907 A1* | 12/2013 | Warren | ................... | G06F 9/448 717/125 |
| 2014/0258990 A1* | 9/2014 | Klic | ......................... | G06F 9/44 717/128 |
| 2016/0048441 A1* | 2/2016 | Husar | ................. | G06F 11/3636 717/128 |
| 2017/0168955 A1* | 6/2017 | Boehm | ............... | G06F 11/0709 |
| 2018/0253368 A1* | 9/2018 | Villarreal | ............ | G06F 11/3664 |
| 2019/0121719 A1* | 4/2019 | Hamon | ............... | G06F 11/3664 |

OTHER PUBLICATIONS

Moran et al., "Automatically Discovering, Reporting and Reproducing Android Application Crashes", published by 2016 IEEE International Conference on Software Testing, Verification and Validation, pp. 33-44 (Year: 2016).*

Microsoft Computer Dictionary, fifth Edition, published by Microsoft, ISBN 0-7356-1495-4, 2002, p. 175 (Year: 2002).*

(Continued)

*Primary Examiner* — S. Sough
*Assistant Examiner* — Zheng Wei
(74) *Attorney, Agent, or Firm* — Sheppard Mullin Richter & Hampton LLP

(57) ABSTRACT

Systems, methods, and non-transitory computer-readable media can receive from a user computing device raw stack trace information associated with an exception that has occurred within a computing application on the user computing device. Debugging information associated with the computing application is retrieved. Human-readable stack trace information is generated based on the raw stack trace information and the debugging information.

20 Claims, 7 Drawing Sheets

(56) References Cited

OTHER PUBLICATIONS

Ghafoor et al., "Corss Platform Bug Correlation using Stack Traces", published by IEEE—2016 International Conference on Frontiers of Information Technology, pp. 199-204 (Year: 2016).*

Jiang et al., "A♦♦Debugging Approach for Java Runtime Exceptions Based on Program Slicing and stack traces", published by IEEE—2010 10th International Conference on Quality Software, pp. 393-398 (Year: 2010).*

* cited by examiner

300

```
┌─────────────────────────────────────────────────────────────────────────┐
│ Receive an application build associated with a computing application,   │
│ wherein the computing application is associated with an application     │
│ developer, and the application build comprises application code, a      │
│ crash reporting system, and debugging information                       │
│                                   302                                   │
└─────────────────────────────────────────────────────────────────────────┘
                                     │
                                     ▼
┌─────────────────────────────────────────────────────────────────────────┐
│ Make an application package available for transmission to user          │
│ computing devices, wherein the application package includes the         │
│ application code and the crash reporting system and excludes the        │
│ debugging information                                                   │
│                                   304                                   │
└─────────────────────────────────────────────────────────────────────────┘
                                     │
                                     ▼
┌─────────────────────────────────────────────────────────────────────────┐
│ Store the debugging information in an application developer computing   │
│ device associated with the application developer                        │
│                                   306                                   │
└─────────────────────────────────────────────────────────────────────────┘
```

```
Detect an exception that has occurred within a computing application on a user computing
device, wherein the computing application is associated with an application developer
402
```

```
Retrieve raw stack trace information associated with the exception
404
```

```
Transmit the raw stack trace information to a remote computing device remote from the
user computing device and associated with the application developer
406
```

```
┌─────────────────────────────────────────────────────────────────────────┐
│ Receive from a user computing device raw stack trace information        │
│ associated with an exception that has occurred within a computing       │
│ application on the user computing device                                │
│                                  502                                    │
└─────────────────────────────────────────────────────────────────────────┘
                                    │
                                    ▼
┌─────────────────────────────────────────────────────────────────────────┐
│ Retrieve debugging information associated with the computing application│
│                                  504                                    │
└─────────────────────────────────────────────────────────────────────────┘
                                    │
                                    ▼
┌─────────────────────────────────────────────────────────────────────────┐
│ Generate human-readable stack trace information based on the raw stack  │
│ trace information and the debugging information                         │
│                                  506                                    │
└─────────────────────────────────────────────────────────────────────────┘
```

FIGURE 5

SYSTEMS AND METHODS FOR APPLICATION EXCEPTION HANDLING

FIELD OF THE INVENTION

The present technology relates to applications on computing devices. More particularly, the present technology relates to handling application exceptions.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others. In certain instances, users may utilize computing applications on their computing devices to carry out such tasks.

SUMMARY

Various embodiments of the present technology can include systems, methods, and non-transitory computer readable media configured to receive from a user computing device raw stack trace information associated with an exception that has occurred within a computing application on the user computing device. Debugging information associated with the computing application is retrieved. Human-readable stack trace information is generated based on the raw stack trace information and the debugging information.

In an embodiment, the debugging information is stored remotely from the user computing device.

In an embodiment, the human-readable stack trace information is generated remotely from the user computing device.

In an embodiment, the raw stack trace information comprises a set of numerical values, and the set of numerical values are associated with one or more functions called within the computing application prior to the occurrence of the exception.

In an embodiment, the set of numerical values comprise application code offsets.

In an embodiment, the human-readable stack trace information comprises a set of strings, and the set of strings are associated with the one or more functions called within the computing application prior to the occurrence of the exception.

In an embodiment, the debugging information comprises a mapping from raw stack trace information in a numerical format to human-readable stack trace information in a string format.

In an embodiment, an application build associated with the computing application is received. The application build comprises application code, a crash reporting system, and the debugging information. An application package is made available for transmission to user computing devices. The application package includes the application code and the crash reporting system, and excludes the debugging information.

In an embodiment, the raw stack trace information is collected on the user computing device by accessing a private field of the Java Throwable class.

In an embodiment, the private field of the Java Throwable class is accessed using the Java reflection feature.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 3 illustrates an example method, according to an embodiment of the present technology.

FIG. 4 illustrates an example method, according to an embodiment of the present technology.

FIG. 5 illustrates an example method, according to an embodiment of the present technology.

Figure 1:
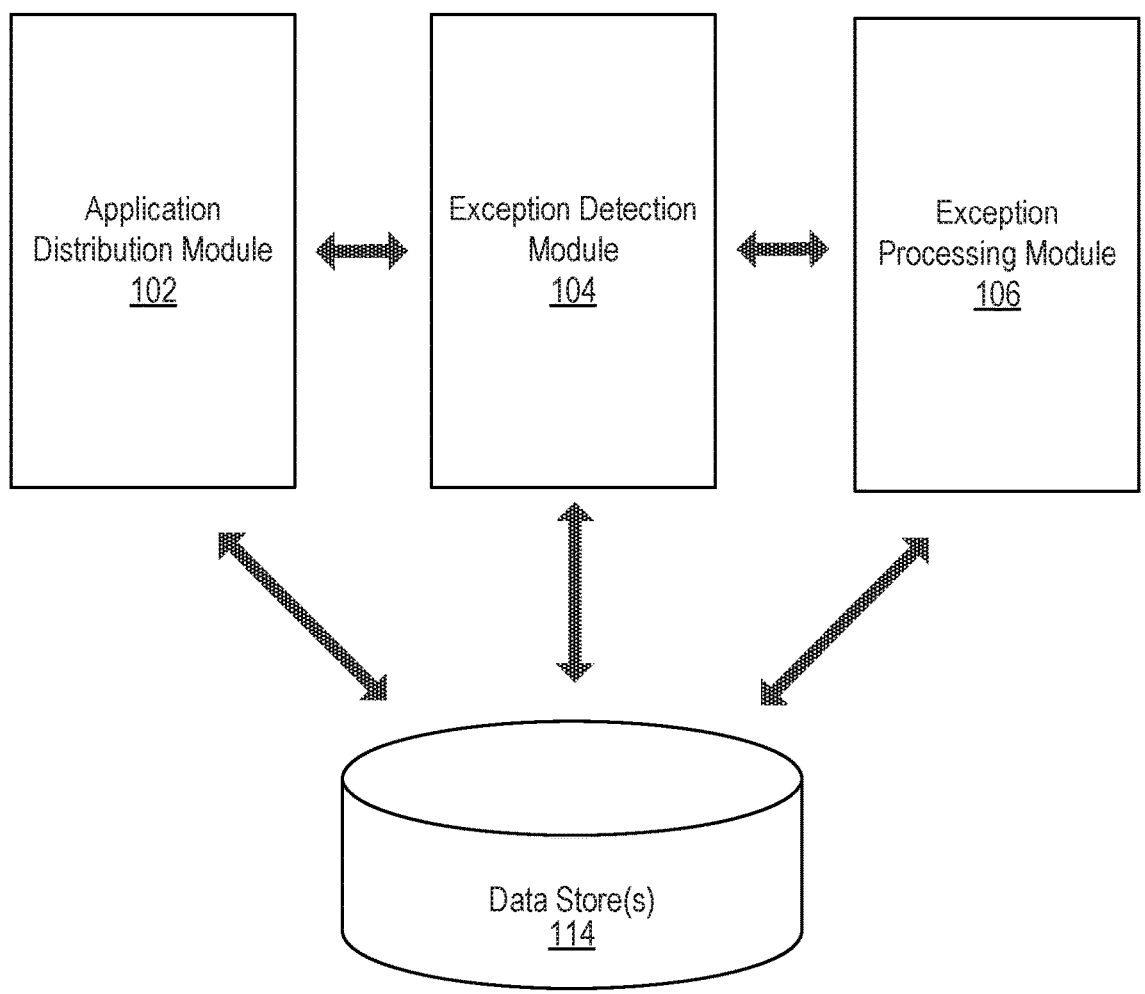
FIG. 1 illustrates an example system including an application distribution module, an exception detection module, and an exception processing module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Handling Computing Application Exceptions

People often utilize computing devices (or systems) for a wide variety of purposes. Users can use their computing devices to, for example, interact with one another, access content, share content, and create content. Users may utilize computing applications on their computing devices to carry out such tasks. Computing applications (also referred to herein as "applications") can provide users with various user interfaces that the user can interact with to carry out various tasks on their computing devices.

Computing applications may be developed and distributed to users by application developers. For example, a social networking system may develop and distribute an application that allows users to retrieve, view, and interact with content on the social networking system. As technology has improved, computing applications provide users with more sophisticated tools and features to improve user experience and enjoyment of these applications. However, the addition of new, more sophisticated tools and features has also resulted in corresponding increases in application size. Significant increases in application size have resulted in applications taking up greater amounts of the finite storage space on user computing devices. Furthermore, computing applications are now typically downloaded onto computing devices using a network connection. Larger applications require greater amounts of bandwidth to download and install. This may make it difficult for users with limited storage space and/or limited network connections to acquire very large computing applications. Conventional approaches may not be effective in addressing these and other problems arising in computer technology.

An improved approach rooted in computer technology overcomes the foregoing and other disadvantages associated with conventional approaches specifically arising in the realm of computer technology. In general, the presently disclosed technology can decrease application size by removing debugging information utilized in application exception handling. In various embodiments, an exception can include any event which occurs during the execution of a computing application (or program) that disrupts normal or expected operation of the computing application's instructions. Under conventional approaches, computing applications (such as Java applications) have been distributed to user computing devices with a set of debugging information. In conventional approaches, the debugging information is stored locally on a user computing device so that when an exception (e.g., an error) in the application occurs, the user computing device can generate a human-readable error report. The human-readable error report may then be provided to an application developer for the application developer to review. As mentioned above, such conventional approaches may be undesirable, as they can lead to bloated computing applications that occupy more storage space on a user computing device than may be necessary, or take longer to download onto a user computing device.

In contrast, the presently disclosed technology provides an improved approach in which application sizes can be decreased by removing the debugging information from the application package that is transmitted and stored on a user computing device. Rather than transmitting the debugging information as part of an application and storing the debugging information locally on a user computing device, debugging information associated with an application may be stored remotely (e.g., on a remote server and/or cloud storage). When an exception occurs within an application on a user computing device, the user computing device can collect raw stack trace information pertaining to the application and the exception. The raw stack trace information may comprise a set of numerical values (e.g., integer values) associated with a set of function calls within the application that occurred immediately prior to the occurrence of the exception in the application. The raw stack trace information may not be easily read or interpreted by a human developer. The raw stack trace information can be transmitted from the user computing device to the application developer (e.g., a server associated with the application developer). The application developer can then utilize the remotely stored debugging information associated with the application to translate the raw stack trace information into human-readable stack trace information. The human-readable stack trace information may translate the numerical values in the raw stack trace information into strings that can be read by a human developer. In this way, the improved approach to application exception handling disclosed herein provides the same results as conventional approaches while significantly decreasing the size of the application that is transmitted to and stored on user computing devices. More details relating to the disclosed technology are provided below.

FIG. 1 illustrates an example system 100 including an application distribution module 102, an exception detection module 104, and an exception processing module 106, according to an embodiment of the present technology. The application distribution module 102, the exception detection module 104, and the exception processing module 106 can collectively be configured to distribute a computing application and process exceptions that may occur within the computing application on user computing devices. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the application distribution module 102, the exception detection module 104, and/or the exception processing module 106 can be implemented in any suitable combinations.

In some embodiments, the application distribution module 102, the exception detection module 104, and/or the exception processing module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the application distribution module 102, the exception detection module 104, and/or the exception processing module 106 can be, in part or in whole, implemented as software running on one or more computing devices or systems, such as on a server system or a client (e.g., user) computing device. In some instances, the application distribution module 102, the exception detection module 104, and/or the exception processing module 106 can be, in part or in whole, implemented within or configured to operate in conjunction with or be integrated with a social networking system (or service), such as a social networking system 630 of FIG. 6. Likewise, in some instances, the application distribution module 102, the exception detection module 104, and/or the exception processing module 106 can be, in part or in whole, implemented within or configured to operate in conjunction with or be integrated with a client computing device, such as the user device 610 of FIG. 6. For example, the application distribution module 102, the exception detection module 104, and/or the exception processing module 106 can, in part of in whole, be implemented as or within a dedicated application (e.g., app), a program, or an applet running on a user computing device or client computing system. The application incorporating or implementing instructions for performing functionality of the application distribution module 102, the exception detection module 104, and/or the exception processing module 106 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The application distribution module 102, the exception detection module 104, and/or the exception processing module 106 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geofenced areas, maps, places, events, pages, groups, posts, communications, content, feeds, account settings, privacy settings, a social graph, and various other types of data. In some embodiments, the data store 114 can store information that is utilized by the application distribution module 102, the exception detection module 104, and/or the exception processing module 106. For example, the data store 114 can store one or more application builds and/or debugging information pertaining to one or more computing applications. Such debugging information may be stored remotely from one or more user computing devices, such as the user device 610 of FIG. 6. It is contemplated that there can be many variations or other possibilities.

The application distribution module 102 can be configured to receive an application build comprising a plurality of components associated with a computing application. In an embodiment, the application build can comprise application code comprising code for implementing the computing application. In an embodiment, the application build can also comprise a crash reporting system. The crash reporting system can comprise code that is configured to generate and/or collect raw stack trace information when an exception occurs. One example of a crash reporting system is the Application Crash Reports for Android (ACRA) library utilized in applications implemented on the Android Operating System.

In an embodiment, the application build can also comprise debugging information associated with the computing application. Debugging information can provide a mapping between raw stack trace information and human-readable stack trace information. In an embodiment, raw stack trace information may comprise a set of numerical values that are indicative of functions that were called prior to (e.g., immediately prior to) an exception occurring within an application. The numerical values may include application code offsets that can be utilized to identify functions that were called immediately prior to an exception occurring. In an embodiment, raw stack trace information may identify a Java file and a line of code associated with one or more functions that were called immediately prior to an exception in an application. In certain embodiments, raw stack trace information may include and/or be referred to as "raw stack trace offsets," "stackState," or "backtrace." Human-readable stack trace information can include function names in a string format that can be read by a human developer. As such, in an embodiment, raw stack trace information may comprise a numerical representation of functions that were called immediately preceding an exception in an application and human-readable stack trace information may comprise string representations of the same functions. The debugging information may provide a mapping that allows for conversion of raw stack trace information into human-readable stack trace information.

As discussed above, a computing application may be associated with application code, a crash reporting system, and debugging information. These components may collectively be referred to as an "application build." In an embodiment, when a user requests a computing application to be downloaded to his or her user computing device, the application distribution module 102 may transmit to the user computing device an application package comprising the application code and the crash reporting system. The application code and the crash reporting system can be downloaded to the user computing device and can be stored locally on the user computing device. However, the debugging information is not included in the application package and is not transmitted to the user computing device. Rather, the debugging information is stored remotely from the user computing device. For example, the debugging information may be stored on a remote server associated with an application developer. In certain embodiments, rather than transmitting the application code and the crash reporting system to a user computing device, the application distribution module 102 may make the application package comprising the application code and the crash reporting system available for acquisition and/or download by user computing devices. For example, the application distribution module 102 may make the application package available in an app store such that when a user wishes to download the computing application to his or her computing device, the user computing device can retrieve and download the application package from the app store.

The exception detection module 104 can be configured to detect if an exception has occurred in a computing application running on a user computing device. In an embodiment, at least some functions performed by the exception detection module 104 may be carried out, at least in part, by a crash reporting system associated with the computing application and stored locally on the user computing device. When an exception occurs in a computing application, the exception detection module 104 can be configured to collect raw stack trace information associated with the exception. As discussed above, the raw stack trace information can comprise a set of numbers (e.g., a set of integers and/or a vector of integers). The raw stack trace information may be associated with and/or identify one or more functions that were called in the computing application prior to (e.g., immediately prior to) the exception occurring. In an embodiment, the exception detection module 104 can be configured to collect raw stack trace information by accessing a private field of Java's Throwable class that contains raw stack trace offsets (e.g., application code offsets). The private field may be, for example, the "stackState" field or the "backtrace" field depending on the version of the Android operating system being used. In an embodiment, the exception detection module 104 can access the private field of Java's Throwable class using the reflection feature available in Java. The exception detection module 104 can transmit the raw stack trace information to an application developer (e.g., transmit the raw stack trace information over a network to a remote computing device associated with the application developer).

The exception processing module 106 can be configured to receive raw stack trace information associated with an exception that has occurred within a computing application on a user computing device. The exception processing module 106 can also be configured to retrieve and/or access debugging information associated with the computing application. As discussed above, debugging information may comprise a mapping that translates and/or converts raw stack trace information (which may be in a numerical format) into human-readable stack trace information (which may be in a string format). The exception processing module 106 can utilize the debugging information to convert the raw stack trace information into human-readable stack trace information. The exception processing module 106 can generate an exception report based on the human-readable stack trace information. The human-readable stack trace information and/or the exception report can be provided to an application developer associated with the computing application. The application developer can then review the exception report (which is in a human-readable format) and make any appropriate revisions and/or updates to the computing application to correct or avoid such exceptions in the future.

Figure 2:
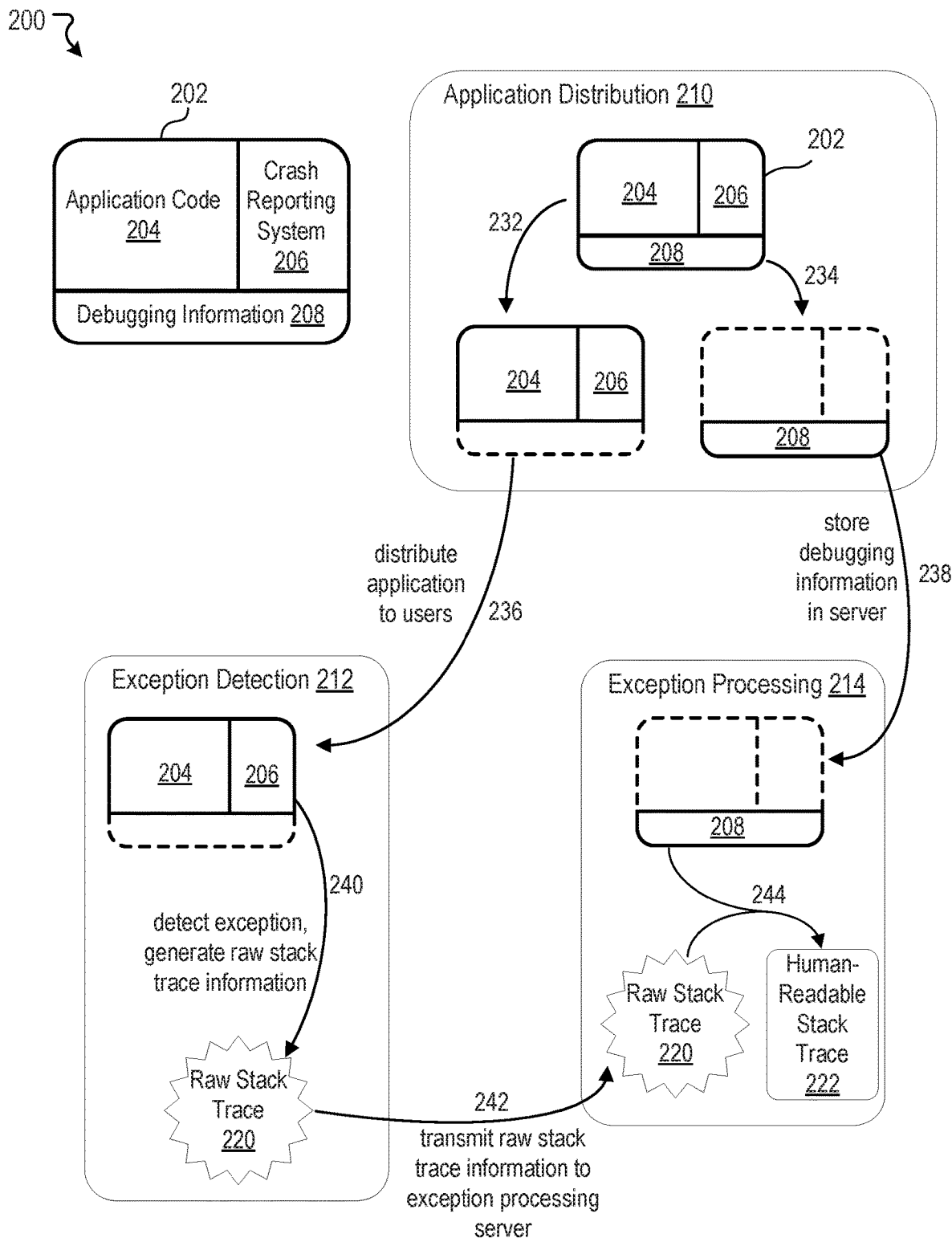
FIG. 2 illustrates an example functional block diagram associated with handling of application exceptions, according to an embodiment of the present technology.

FIG. 2 illustrates an example functional block diagram 200 associated with handling of exceptions in computing applications, according to an embodiment of the present disclosure. In the functional block diagram 200, a computing application is associated with an application build 202. The application build 202 includes application code 204, a crash reporting system 206, and debugging information 208. The functional block diagram 200 illustrates three stages for handling of computing application exceptions: application distribution 210, exception detection 212, and exception processing 214. The three stages may correspond to the application distribution module 102, the exception detection module 104, and the exception processing module 106 of FIG. 1, respectively.

In the application distribution stage 210, the application build 202 is divided into a first package that includes the application code 204 and the crash reporting system 206 (arrow 232) and a second package that includes the debugging information 208 (arrow 234). The application code 204 and the crash reporting system 206 can be distributed to and stored locally on user computing devices (arrow 236). The debugging information 208 is not distributed to or stored locally on user computing devices. Rather, the debugging information 208 is stored remotely (e.g., on a remote server) (arrow 238). By separating the debugging information 208, the application package that is transmitted to and stored locally on user computing devices is made significantly smaller in size. In certain instances, application size savings of between 10-15% may be realized.

In the exception detection stage 212, the crash reporting system 206 detects an exception that has occurred while the computing application was running on a user computing device. The crash reporting system 206 can collect raw stack trace information 220 (arrow 240). The crash reporting system 206 can then transmit the raw stack trace information 220 to an application developer (arrow 242).

In the exception processing stage 214, the application developer can receive the raw stack trace information 220 at a remote computing device (e.g., a remote server). The remote server can also access and/or retrieve debugging information 208 associated with the computing application. The remote server can utilize the debugging information 208 to translate the raw stack trace information 220 into human-readable stack trace information 222 (arrow 244). The human-readable stack trace information 222 (and/or an exception report generated based on the human-readable stack trace information 222) can be provided to the application developer. By removing the debugging information 208 and the exception processing stage 214 from the user computing device, and storing this information and performing these functions remotely from the user computing device, the size of the application information stored on a user computing device can be significantly decreased.

FIG. 3 illustrates an example method 300 associated with application distribution, according to an embodiment of the present technology. It should be appreciated that there can be additional, fewer, or alternative steps performed in similar or alternative orders, or in parallel, within the scope of the various embodiments discussed herein unless otherwise stated.

At block 302, the example method 300 can receive an application build associated with a computing application, wherein the computing application is associated with an application developer, and the application build comprises application code, a crash reporting system, and debugging information. At block 304, the example method 300 can make an application package available for transmission to user computing devices, wherein the application package includes the application code and the crash reporting system and excludes the debugging information. At block 306, the example method 300 can store the debugging information in an application developer computing device associated with the application developer.

FIG. 4 illustrates an example method 400 associated with application exception detection, according to an embodiment of the present technology. It should be appreciated that there can be additional, fewer, or alternative steps performed in similar or alternative orders, or in parallel, within the scope of the various embodiments discussed herein unless otherwise stated.

At block 402, the example method 400 can detect an exception that has occurred within a computing application on a user computing device, wherein the computing application is associated with an application developer. At block 404, the example method 400 can retrieve raw stack trace information associated with the exception. At block 406, the example method 400 can transmit the raw stack trace information to a remote computing device remote from the user computing device and associated with the application developer.

FIG. 5 illustrates an example method 500 associated with application exception processing, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive from a user computing device raw stack trace information associated with an exception that has occurred within a computing application on the user computing device. At block 504, the example method 500 can retrieve debugging information associated with the computing application. At block 506, the example method 500 can generate human-readable stack trace information based on the raw stack trace information and the debugging information.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
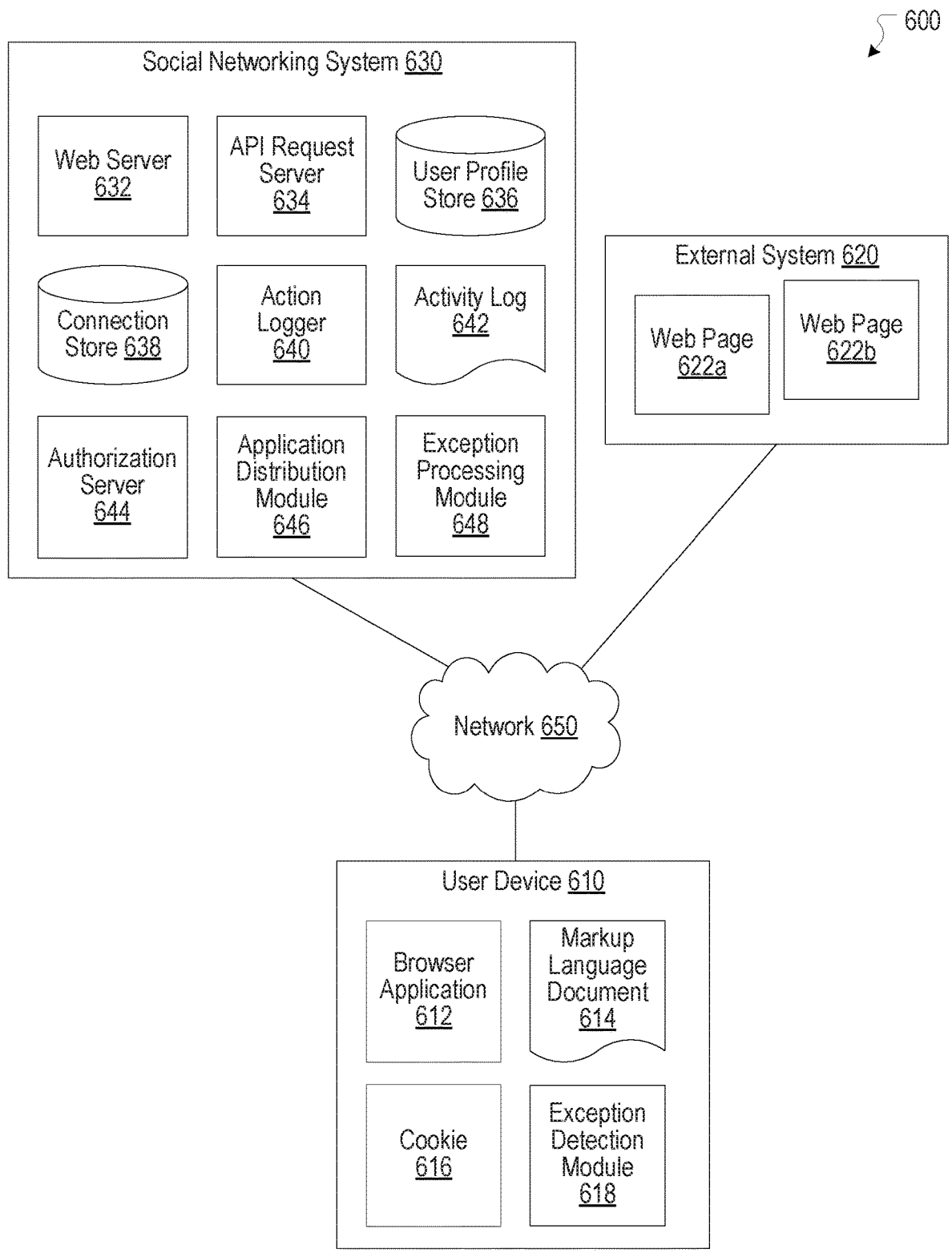
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an application distribution module 646. The application distribution module 646 can, for example, be implemented as the application distribution module 102, as discussed in more detail herein. In some embodiments, the social networking system 630 can include an exception processing module 648. The exception processing module 648 can, for example, be implemented as the exception processing module 106, as discussed in more detail herein. In some embodiments, the user device 610 can include an exception detection module 618. The exception detection module 618 can, for example, be implemented as the exception detection module 104, as discussed in more detail herein. As discussed previously, it should be appreciated that there can be many variations or other possibilities. For example, in some embodiments, one or more functionalities of the application distribution module 646 and/or the exception processing module 648 can be implemented in the user device 610 and/or one or more functionalities of the exception detection module 618 can be implemented in the social networking system 630. As discussed previously, it should be appreciated that there can be many variations or other possibilities.

Hardware Implementation

Figure 7:
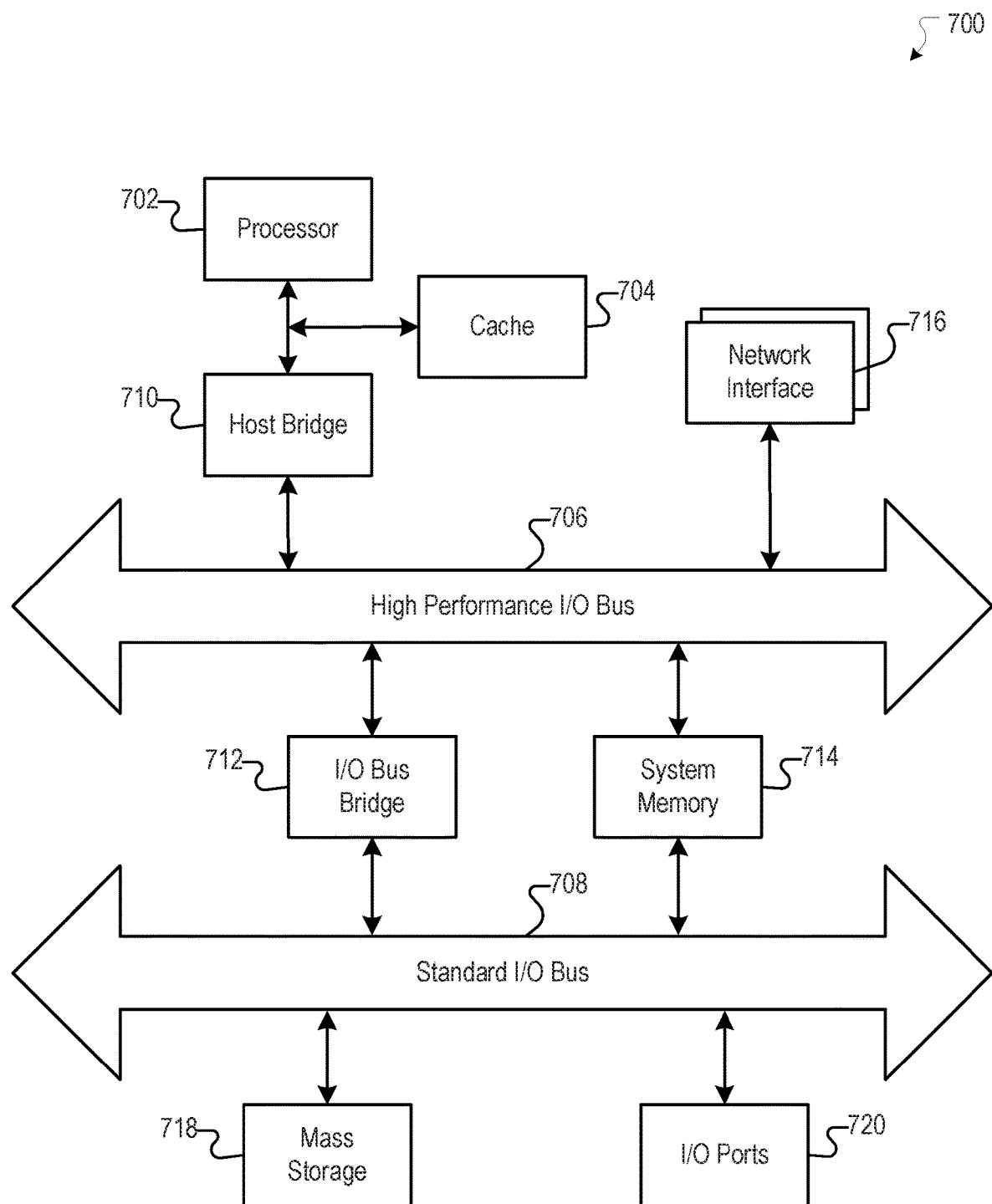
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a computing system, based on an application build, a first package that includes application code associated with a computing application and a crash reporting system that collects raw stack trace information;
    generating, by the computing system, based on the application build, a second package that includes debugging information associated with the computing application that translates the raw stack trace information in a numerical format to human-readable stack trace information in a string format;
    providing, by the computing system, the second package that includes the debugging information associated with the computing application to a remote server;
    providing, by the computing system, the first package to a user computing device;
    receiving, by the computing system, from the user computing device, the raw stack trace information associated with an exception that has occurred within the computing application on the user computing device, wherein the raw stack trace information identifies at least a file and at least a line of code associated with one or more functions that were called prior to the occurrence of the exception;
    retrieving, by the computing system, the debugging information associated with the computing application from the remote server; and
    generating, by the computing system, the human-readable stack trace information based on the raw stack trace information and the debugging information.

2. The computer-implemented method of claim 1, wherein the human-readable stack trace information is generated remotely from the user computing device.

3. The computer-implemented method of claim 1, wherein
    the raw stack trace information comprises a set of numerical values, and
    the set of numerical values are associated with one or more functions called within the computing application prior to the occurrence of the exception.

4. The computer-implemented method of claim 3, wherein the set of numerical values comprise application code offsets.

5. The computer-implemented method of claim 3, wherein
    the human-readable stack trace information comprises a set of strings, and
    the set of strings are associated with the one or more functions called within the computing application prior to the occurrence of the exception.

6. The computer-implemented method of claim 1, wherein the debugging information comprises a mapping from the raw stack trace information in the numerical format to the human-readable stack trace information in the string format.

7. The computer-implemented method of claim 1, further comprising:
    receiving the application build associated with the computing application, wherein the application build comprises the application code, the crash reporting system, and the debugging information; and
    making the first package available for transmission to user computing devices, wherein the first package excludes the debugging information.

8. The computer-implemented method of claim 1, wherein the raw stack trace information is collected on the user computing device by accessing a private field of Java Throwable class.

9. The computer-implemented method of claim 8, wherein the private field of the Java Throwable class is accessed using Java reflection feature.

10. A system comprising:
    at least one processor; and
    a memory storing instructions that, when executed by the at least one processor, cause the system to perform a method comprising:
        generating, based on an application build; a first package that includes application code associated with a computing application and a crash reporting system that collects raw stack trace information;
        generating, based on the application build, a second package that includes debugging information associated with the computing application that translates the raw stack trace information in a numerical format to human-readable stack trace information hi a string format;
        providing the second package that includes the debugging information associated with the computing application to a remote server;
        providing the first package to a user computing device;
        receiving, from the user computing device, the raw stack trace information associated with an exception that has occurred within the computing application on the user computing device, wherein the raw stack trace information identifies at least a file and at least a line of code associated with one or more functions that were called prior to the occurrence of the exception;
        retrieving the debugging information associated with the computing application from the remote server; and
        generating the human-readable stack trace information based on the raw stack trace information and the debugging information.

11. The system of claim 10, wherein the human-readable stack trace information is generated remotely from the user computing device.

12. The system of claim 10, wherein
    the raw stack trace information comprises a set of numerical values, and
    the set of numerical values are associated with one or more functions called within the computing application prior to the occurrence of the exception.

13. The system of claim 12, wherein the set of numerical values comprise application code offsets.

14. The system of claim 10, wherein the instructions further cause the computing system to perform the method comprising:
- receiving the application build associated with the computing application, wherein the application build comprises the application code, the crash reporting system, and the debugging information; and
- making the first package available for transmission to user computing devices, wherein the first package excludes the debugging information.

15. A non-transitory computer-readable storage medium including instructions that, when executed by at least one processor of a computing system, cause the computing system to perform a method comprising:
- generating, based on an application build, a first package that includes application code associated with a computing application and a crash reporting system that collects raw stack trace information;
- generating, based on the application build, a second package that includes debugging information associated with the computing application that translates the raw stack trace information hi a numerical format to human-readable stack trace information in a string format:
- providing the second package that includes the debugging information associated with the computing application to a remote server;
- providing the first package to a user computing device;
- receiving, from the user computing device, the raw stack trace information associated with an exception that has occurred within the computing application on the user computing device, wherein the raw stack trace information identifies at least a file and at least a line of code associated with one or more functions that were called prior to the occurrence of the exception;
- retrieving the debugging information associated with the computing application from the remote server; and
- generating the human-readable stack trace information based on the raw stack trace information and the debugging information.

16. The non-transitory computer-readable storage medium of claim 15, wherein the debugging information comprises a mapping from the raw stack trace information in the numerical format to the human-readable stack trace information in the string format.

17. The non-transitory computer-readable storage medium of claim 16, wherein the human-readable stack trace information is generated remotely from the user computing device.

18. The non-transitory computer-readable storage medium of claim 15, wherein
- the raw stack trace information comprises a set of numerical values, and
- the set of numerical values are associated with one or more functions called within the computing application prior to the occurrence of the exception.

19. The non-transitory computer-readable storage medium of claim 18, wherein the set of numerical values comprise application code offsets.

20. The non-transitory computer-readable storage medium of claim 15, wherein the instructions further cause the computing system to perform the method comprising:
- receiving the application build associated with the computing application, wherein the application build comprises the application code, the crash reporting system, and the debugging information; and
- making the first package available for transmission to user computing devices, wherein the first application package excludes the debugging information.

* * * * *